US012792576B2

(12) United States Patent
Wong

(10) Patent No.: US 12,792,576 B2
(45) Date of Patent: Nov. 10, 2026

(54) COMPUTER-IMPLEMENTED METHODS AND COMPUTING SYSTEMS FOR ENRICHING AND STRUCTURING DATA ASSOCIATED WITH AN ITEM

(71) Applicant: Chien Yaw Wong, Cambridge (GB)

(72) Inventor: Chien Yaw Wong, Cambridge (GB)

( * ) Notice: Subject to any disclaimer, the term of this patent is extended or adjusted under 35 U.S.C. 154(b) by 0 days.

(21) Appl. No.: 18/618,911

(22) Filed: Mar. 27, 2024

(65) Prior Publication Data

US 2025/0307217 A1 Oct. 2, 2025

(51) Int. Cl.

*G06F 16/215* (2019.01)
*G06F 16/242* (2019.01)
*G06F 16/27* (2019.01)
*G06Q 20/36* (2012.01)

(52) U.S. Cl.

CPC .......... *G06F 16/215* (2019.01); *G06F 16/243* (2019.01); *G06F 16/27* (2019.01); *G06Q 20/3678* (2013.01); *G06Q 2220/00* (2013.01)

(58) Field of Classification Search

CPC .... G06F 16/3344; G06F 40/40; G06F 16/215; G06F 16/243; G06F 16/27; G06Q 20/3678
USPC .................................................. 707/692, 722
See application file for complete search history.

(56) References Cited

U.S. PATENT DOCUMENTS 11,567,978 B2 1/2023 Neeman et al.
11,960,500 B1 * 4/2024 Sboychakova ......... G06F 40/20
12,197,452 B1 * 1/2025 Merchant .............. G06F 16/243
12,217,029 B1 * 2/2025 Andre ........................ G06F 8/35
2006/0064410 A1 * 3/2006 Razza .................... G06F 16/958
2017/0154015 A1 * 6/2017 O'Keeffe ............ G06F 3/04812
2018/0349343 A1 * 12/2018 Bull ...................... G06F 16/243
2019/0043483 A1 * 2/2019 Chakraborty ......... G10L 15/063
2019/0180258 A1 * 6/2019 Amar ....................... H04L 51/02
2019/0325498 A1 * 10/2019 Clark ................. G06Q 30/0643
2020/0142888 A1 * 5/2020 Alakuijala ............ G06F 16/242
2022/0318860 A1 * 10/2022 Dorch ..................... G10L 15/28
2023/0281230 A1 * 9/2023 Kukla ..................... G06F 16/93 707/722
2023/0298708 A1 9/2023 Ikeguchi et al.
2024/0126795 A1 * 4/2024 Zhong ..................... H04L 51/02
2024/0202461 A1 * 6/2024 Pagnoni ................ G06F 16/345
(Continued)

*Primary Examiner* — Cam Linh T Nguyen
(74) *Attorney, Agent, or Firm* — Pasadena Legal Group; Norman R. Van Treeck

(57) ABSTRACT

A computer-implemented method for enriching and structuring data associated with an item includes receiving initial query data associated with the item in structured and/or unstructured form, from a user computing device associated with a user, and generating enriched structured query data, providing the enriched structured query data to an Artificial Intelligence (AI) agent and receiving AI response data associated with the item, in structured and/or unstructured form, from the AI agent, wherein the AI agent is in communication with a plurality of data repositories, adding the received AI response data to the initial query data to generate enriched data associated with the item, rearranging the enriched data into a predefined data structure to generate enriched and structured output data, wherein the enriched and structured output data comprises one or more recommendations pertaining to the item, and transmitting the enriched and structured output data to the user computing device.

14 Claims, 7 Drawing Sheets

(56) References Cited

U.S. PATENT DOCUMENTS

| | | | | |
|---|---|---|---|---|
| 2024/0289407 | A1* | 8/2024 | Rofouei | G06F 16/9577 |
| 2024/0296295 | A1* | 9/2024 | Russell | G06F 40/56 |
| 2024/0311546 | A1* | 9/2024 | Maschmeyer | G06F 40/166 |
| 2024/0354436 | A1* | 10/2024 | Mukherjee | G06F 16/3344 |
| 2024/0354710 | A1* | 10/2024 | Logiotatidis | G06F 40/205 |
| 2024/0411813 | A1* | 12/2024 | Yim | G06F 40/30 |

* cited by examiner

COMPUTER-IMPLEMENTED METHODS AND COMPUTING SYSTEMS FOR ENRICHING AND STRUCTURING DATA ASSOCIATED WITH AN ITEM

TECHNICAL FIELD

The present invention relates to Artificial Intelligence (AI) based automation of data analytics. More specifically, the present invention relates to the automated enrichment and structuring of data using AI agents.

BACKGROUND ART

Unstructured data comes in myriad forms (text, images, audio, video, etc.), each with its complexities, making the unstructured data harder to process. Moreover, unstructured data often lacks descriptive information about its origin or content. Furthermore, many queries based on unstructured data are in the form of natural language containing nuances, idioms, and context-dependent meanings challenging to interpret through rule-based methods alone. Cleaning and labeling unstructured data often relies on human intervention, making it time-consuming and prone to errors as datasets grow.

Therefore, conventional approaches to enrichment and structuring of unstructured data and queries based on unstructured data might require extensive rule creation for different data types, hindering scalability and adaptability. Cleaning unstructured data with manual or rule-based systems alone can lead to inconsistencies and errors. Moreover, valuable information buried within the unstructured data might be missed when applying conventional rule-based solutions. Furthermore, conventional methods might struggle to integrate unstructured data with structured data sources. Especially, since unstructured data is stored in disparate silos it becomes difficult for the conventional solutions to provide a holistic view of the structured and unstructured data if and when combined or integrated.

Therefore, there is a need in the art for computer-implemented methods and computing systems for enriching and structuring data associated with an item, that do not suffer from the aforementioned deficiencies.

Objects of the Invention

Some of the objects of the invention are as follows:

An object of the present invention is to provide computer-implemented methods and computer systems that leverage AI agents for the enrichment, integration, and structuring of unstructured data.

Another object of the present invention is to provide computer-implemented methods and computer systems that leverage computer vision algorithms and Natural Language Processing (NLP) algorithms to extract valuable insights from unstructured data queries.

Another object of the present invention is to provide computer-implemented methods and computer systems that allow enriched and structured output data to be generated in correlation with user-associated data.

Another object of the present invention is to provide computer-implemented methods and computer systems that allow users to further customize enriched and structured output datasets thus generated by adding user-defined information to the structured datasets.

It is also an object of the present invention to provide computer-implemented methods and computer systems that allow the enriched and structured output datasets to be added to a decentralized or a distributed database and users to be rewarded in the form of cryptocurrencies or other digital assets in response to providing the enriched and structured output data to the decentralized or the distributed database.

SUMMARY OF THE INVENTION

According to a first aspect of the present invention, there is provided a computer-implemented method for enriching and structuring data associated with an item. The computer-implemented method includes receiving initial query data associated with the item in structured and/or unstructured form, from a user computing device associated with a user and generating enriched structured query data, providing the enriched structured query data to an Artificial Intelligence (AI) agent, and receiving AI response data associated with the item, in structured and/or unstructured form, from the AI agent, wherein the AI agent is in communication with a plurality of data repositories, adding the received AI response data to the initial query data to generate enriched data associated with the item, rearranging the enriched data into a predefined data structure to generate enriched and structured output data, wherein the enriched and structured output data includes one or more recommendations pertaining to the item and transmitting the enriched and structured output data to the user computing device.

In one embodiment of the invention, the computer-implemented method further includes providing the AI response data received from the AI agent to the user computing device, receiving additional input data from the user computing device in response to the provision of the AI response data, and adding the additional input data to the enriched and structured output data.

In one embodiment of the invention, the computer-implemented method further includes adding the enriched and structured output data to a decentralized database maintained on a plurality of compute nodes.

In one embodiment of the invention, the computer-implemented method further includes adding a predetermined amount of a cryptocurrency to a digital wallet associated with the user computing device.

In one embodiment of the invention, the initial query data comprises textual data, aural data and/or visual data associated with the item.

In one embodiment of the invention, the computer-implemented method further includes performing feature recognition and text extraction from the visual data using computer vision algorithms.

In one embodiment of the invention, the computer-implemented method further includes performing feature recognition and text extraction from the textual data and/or the aural data using Natural Language Processing (NLP) algorithms.

In one embodiment of the invention, the enriched and structured output data is transmitted to the user computing device in form of a JavaScript Object Notation (JSON) object.

In one embodiment of the invention, the computer-implemented method further includes receiving user-associated data, associated with the user, from the user computing device.

In one embodiment of the invention, the enriched structured query data includes the user-associated data to customize the AI response data in correlation with the user-associated data.

According to a second aspect of the present invention, there is provided a computing system for enriching and structuring data associated with an item. The computing system includes a processor, and a memory unit operably connected to the processor. The memory unit includes machine-readable instructions, that when executed by the processor, enable the processor to receive initial query data associated with the item in structured and/or unstructured form, from a user computing device associated with a user and generate enriched structured query data, provide the enriched structured query data to an Artificial Intelligence (AI) agent and receive AI response data associated with the item, in structured and/or unstructured form, from the AI agent, wherein the AI agent is communication with a plurality of data repositories, add the received AI response data to the initial query data to generate enriched data associated with the item, rearrange the enriched data into a predefined data structure to generate enriched and structured output data, wherein the enriched and structured output data includes one or more recommendations pertaining to the item, and transmit the enriched and structured output data to the user computing device.

In one embodiment of the invention, the processor is further enabled to provide the AI response data received from the AI agent to the user computing device, receive additional input data from the user computing device in response to the provision of the AI response data, and add the additional input data to the enriched and structured output data.

In one embodiment of the invention, the processor is further enabled to add the enriched and structured output data to a decentralized database maintained on a plurality of compute nodes.

In one embodiment of the invention, the processor is further enabled to add a predetermined amount of a cryptocurrency to a digital wallet associated with the user computing device.

In one embodiment of the invention, the initial query data comprises textual data, aural data and/or visual data associated with the item.

In one embodiment of the invention, the processor is further enabled to perform feature recognition and text extraction from the visual data using computer vision algorithms.

In one embodiment of the invention, the processor is further enabled to perform feature recognition and text extraction from the textual data and/or the aural data using Natural Language Processing (NLP) algorithms.

In one embodiment of the invention, the processor is further enabled to transmit the enriched and structured output data to the user computing device in form of a JavaScript Object Notation (JSON) object.

In one embodiment of the invention, the processor is further enabled to receive user-associated data, associated with the user, from the user computing device.

In one embodiment of the invention, the enriched structured query data includes the user-associated data to customize the AI response data in correlation with the user-associated data.

In the context of the specification, the phrase "unstructured data" refers to the data that does not follow a predefined schema or format and can vary significantly in length and content. Some of the examples of unstructured data include text documents, images, audio recordings, video recording and sensor data.

In the context of the specification, the phrase "structured data" refers to the data organized in accordance with a predefined schema. The structured data conforms to a data model and predefined rules on how the data is represented (for example, data types, field lengths). Furthermore, data elements within a structured database can have defined relationships with one another. Some of the examples of the structured data include databases, spreadsheets, XML or JSON objects, and web forms.

In the context of the specification, the phrase "Artificial Intelligence (AI) agent" refers to an autonomously acting computer program designed to perceive its environment, make decisions, and take actions to achieve a goal or a set of goals. The AI agents may further be equipped with data-gathering and learning (reinforcement learning, supervised learning, or unsupervised learning) capabilities.

In the context of the specification, the phrase "Large Learning Model (LLM) agent" refers to AI agents that use deep learning techniques to understand, generate, and manipulate human language. LLM agents are trained on relatively large amounts of data that allow them to identify complex patterns and relationships between words. LLM agents are generally equipped with several capabilities such as Natural Language Processing (NLP), Text Generation, Question Answering, Dialogue, and Summarization.

In the context of the specification, the phrase "web scraper agent" also referred to as "web harvester" or "web data extractor" refers to a program used for automatically collecting and extracting data from websites and web pages. The web scraper agents work by mimicking human users, navigating websites, and extracting specific pieces of information based on predefined rules.

In the context of the specification, the phrase "JavaScript Object Notation (JSON)" refers to a format used for storing and exchanging structured data. It is based on JavaScript Object syntax but is language-independent. A JSON object can contain data represented as key-value pairs, nested objects, and arrays, and written as plain text.

In the context of the specification, the phrase "Application Program Interface (API) server" refers to a software program or a computing device that hosts the software program that allows two or more applications to communicate with each other and exchange data and information. In that regard, the API server may be configured to perform several tasks such as (1) translating a request from a source application into a format that is compatible with a destination application, (2) security verification of the source application, for example, by checking IP address, geographical location, ports and channels used, authorization credentials of the source device, etc. (3) protocol verification of the message, such as verification of encryption methodology followed, (4) transmittal of the translated request to the destination application, (5) receive the requested data from the destination application, (6) translate the received data into a format that is compatible with the source application, and (7) transmit the data to the source application over a communication network.

In the context of the specification, the phrase "web server" refers to a computer system or an executable segment of machine-readable instructions that allow communication with client systems (such as a web browser or a standalone computer application) using the Hypertext Transfer Protocol (HTTP), a set of rules that define how web servers and clients exchange information. When a user types a URL into a web browser (acting as a client), the browser sends an HTTP request to the web server that hosts the website. The web server then processes the request and sends back an HTTP response that contains the requested content.

In the context of the specification, the term "processor" refers to one or more of a microprocessor, a microcontroller, a general-purpose processor, a Field Programmable Gate Array (FPGA), a Graphics Processing Unit (GPU), a Neural Processing Unit (NPU), a Tensor Processing Unit (TPU), an Application Specific Integrated Circuit (ASIC), and the like.

In the context of the specification, the phrase "memory unit" refers to volatile storage memory, such as Static Random Access Memory (SRAM) and Dynamic Random Access Memory (DRAM) of types such as Asynchronous DRAM, Synchronous DRAM, Double Data Rate SDRAM, Rambus DRAM, and Cache DRAM, etc.

In the context of the specification, the phrase "storage device" refers to a non-volatile storage memory such as EPROM, EEPROM, flash memory, or the like.

In the context of the specification, the phrase "communication interface" refers to a device or a module enabling direct connectivity via wires and connectors such as USB, HDMI, VGA, or wireless connectivity such as Bluetooth or Wi-Fi, or Local Area Network (LAN) or Wide Area Network (WAN) implemented through TCP/IP, IEEE 802.x, GSM, CDMA, LTE, or other equivalent protocols.

In the context of the specification, the phrase "communication network" refers to a group of several connected devices including computing devices (such as desktops, mobile handheld devices, tablet PCs, notebooks, etc.), local and remotely located servers (such as web servers, application servers, database servers, Application Program Interface (API) servers, load balancers, compute nodes, and the like), routers, antennas, modems, multiplexers, demultiplexers, and the like. In that regard, the aforementioned connected devices may be able to exchange data signals through wired and/or wireless means as per several combinations of several different communication protocols such as 802.11 (Wi-Fi), 802.3 (Ethernet), Bluetooth, NFC, ZigBee and 3GPP protocols such as HSPA, HSDPA, LTE, GSM, CDMA, WLL and the like.

BRIEF DESCRIPTION OF THE ACCOMPANYING DRAWINGS

The accompanying drawings illustrate the best mode for carrying out the invention as presently contemplated and set forth hereinafter. The present invention may be more clearly understood from a consideration of the following detailed description of the preferred embodiments taken in conjunction with the accompanying drawings wherein like reference letters and numerals indicate the corresponding parts in various figures in the accompanying drawings, and in which.

DETAILED DESCRIPTION

Figure 1:
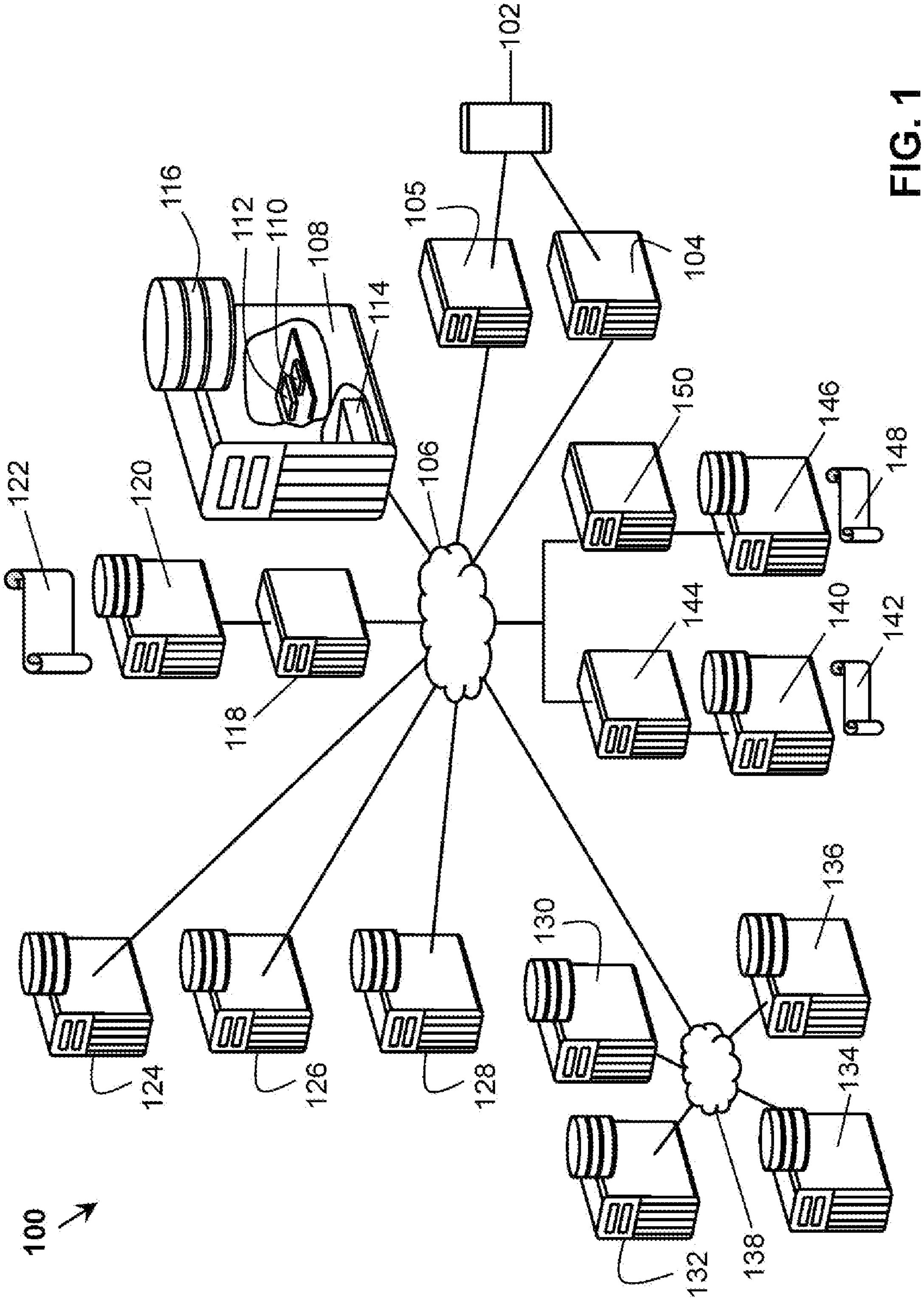
FIG. 1 illustrates an example environment in which several embodiments of the present invention may be implemented.

Embodiments of the present invention disclosure will be described more fully hereinafter with reference to the accompanying drawings in which like numerals represent like elements throughout the figures, and in which example embodiments are shown.

The detailed description and the accompanying drawings illustrate the specific exemplary embodiments by which the disclosure may be practiced. These embodiments are described in detail to enable those skilled in the art to practice the invention illustrated in the disclosure. It is to be understood that other embodiments may be utilized, and other changes may be made, without departing from the spirit or scope of the present disclosure. The following detailed description is therefore not to be taken in a limiting sense, and the scope of the present invention disclosure is defined by the appended claims. Embodiments of the claims may, however, be embodied in many different forms and should not be construed as limited to the embodiments set forth herein.

The terms "a" and "an" herein do not denote a limitation of quantity, but rather denote the presence of at least one of the referenced items. The terms "having", "comprising", "including", and variations thereof signify the presence of a component.

Embodiments of the present invention provide a computer-implemented method and computer systems for enriching and structuring data associated with an item. The present invention includes the receipt of initial query data with item details in structured and/or unstructured formats. The initial query data may be in the form of textual data, image data (still or moving), and/or aural data. The item may be any term, phrase, or segment of audiovisual data in the initial query data that may allow identification of the context of the initial query data. The initial query data may be pre-processed using computer-vision algorithms and Natural Language Processing (NLP) algorithms to extract features and text from the initial query data. The initial query data (with or without extracted features and text) is then provided to an AI agent. The AI agent may be a custom-designed AI agent or a predefined Large Language Model (LLM) such as ChatGPT or Gemini®.

The AI agent would deliver AI response data in structured or unstructured format by collecting information from several data repositories connected to a network. Such data repositories may include web pages, online public databases, online open-source private databases, online private paid databases, data stored on peer-to-peer networks, content aggregators, and the like. The AI response data is then added to the initial query data to generate enriched data associated with the item. In several embodiments, the user may want to add additional input data to the AI response data which may then be further added to the enriched data associated with the item. Furthermore, the enriched data is then rearranged in predefined structures and the enriched and structured output data is transmitted to a user computing device to be displayed to the user. Furthermore, the user may choose to publish the enriched and structured output data onto a distributed database for access by several other users connected and receive rewards in the form of cryptocurrency or other forms of digital assets such as Non-Fungible Tokens (NFTs).

Several embodiments of the present invention will now be discussed in detail with reference to FIGS. 1-7.

FIG. 1 illustrates an example environment 100 in which several embodiments of the present invention may be implemented. The environment 100 includes a user computing device 102 associated with a user. The user computing device 102 may be selected from a group consisting of a smartphone, a desktop PC, a notebook PC, a tablet PC, and the like. The user computing device 102 is connected to a first communication network 106 through a first Application Program Interface (API) server 104. In that regard, the user computing device 102 may be able to communicate with the first communication network 106 using a dedicated standalone application. However, the user computing device 102 is connected to the first communication network 106 also using a first web server 105, allowing the user computing device 102 to connect with the first communication network 106 using a thin client such as a web browser like Google Chrome, Microsoft Edge, Mozilla Firefox, Apple Safari, and the like. Further connected to the communication network 106 is an application server 108 configured to host a software application for implementing several aspects of the present invention. The machine-readable instructions for implementing the present invention may be stored in a storage device 116 and copied into a memory unit 112 during runtime. A processor 110 is configured to execute the machine-readable instructions. Moreover, the application server 108 includes a communication interface 114 enabling the application server 108 to communicate with the first communication network 106 and other devices in the environment 100.

Further connected to the first communication network 106 is an Artificial Intelligence (AI) agent server 120 hosting an AI agent 122. The AI agent server 120 is connected to the first communication network 106 through a second API server 118. Further connected to the first communication network 106 are a plurality of data repositories 124, 126, and 128. The plurality of data repositories 124, 126, and 128 may be representative of web servers hosting several websites including web pages, online public databases, online open-source private databases, online private paid databases, data stored on peer-to-peer networks, content aggregators, and the like. Furthermore, a second communication network 138 is connected to the first communication network 106. The second communication network 138 is constituted by a plurality of compute nodes 130, 132, 134, and 136 hosting identical copies of decentralized and distributed databases of records of enriched and structured output data. Furthermore, an NLP application server 140 hosting an NLP application 142 is connected to the first communication network 106 through a third API server 144. Also, a computer vision application server 146 hosting a computer vision application 148 is connected to the first communication network 106 through a fourth API server 150.

Several embodiments of the present invention will now be discussed taking the environment 100 as a reference. However, a person skilled in the art would appreciate that the present invention is not limited to the environment 100 alone and the embodiment of the present invention may be implemented in several alternate environments without departing from the scope of the invention. The method steps of the method 200 are envisaged to be carried out by the processor 110 executing machine-readable instructions stored in the memory unit 112 during the run-time.

Figure 2:
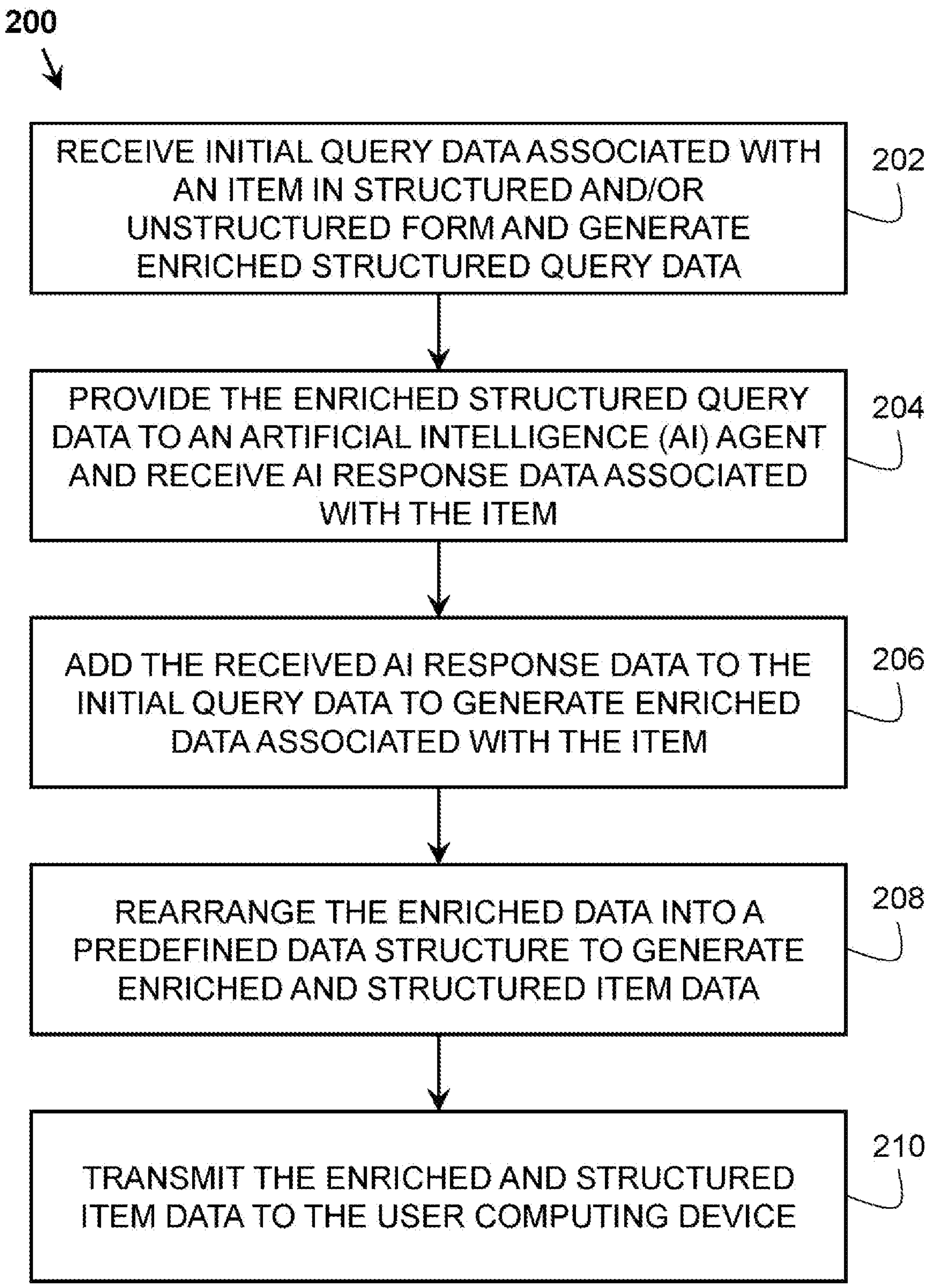
FIG. 2 illustrates a computer-implemented method for enriching and structuring data associated with an item, in accordance with an embodiment of the present invention.
Figure 3:
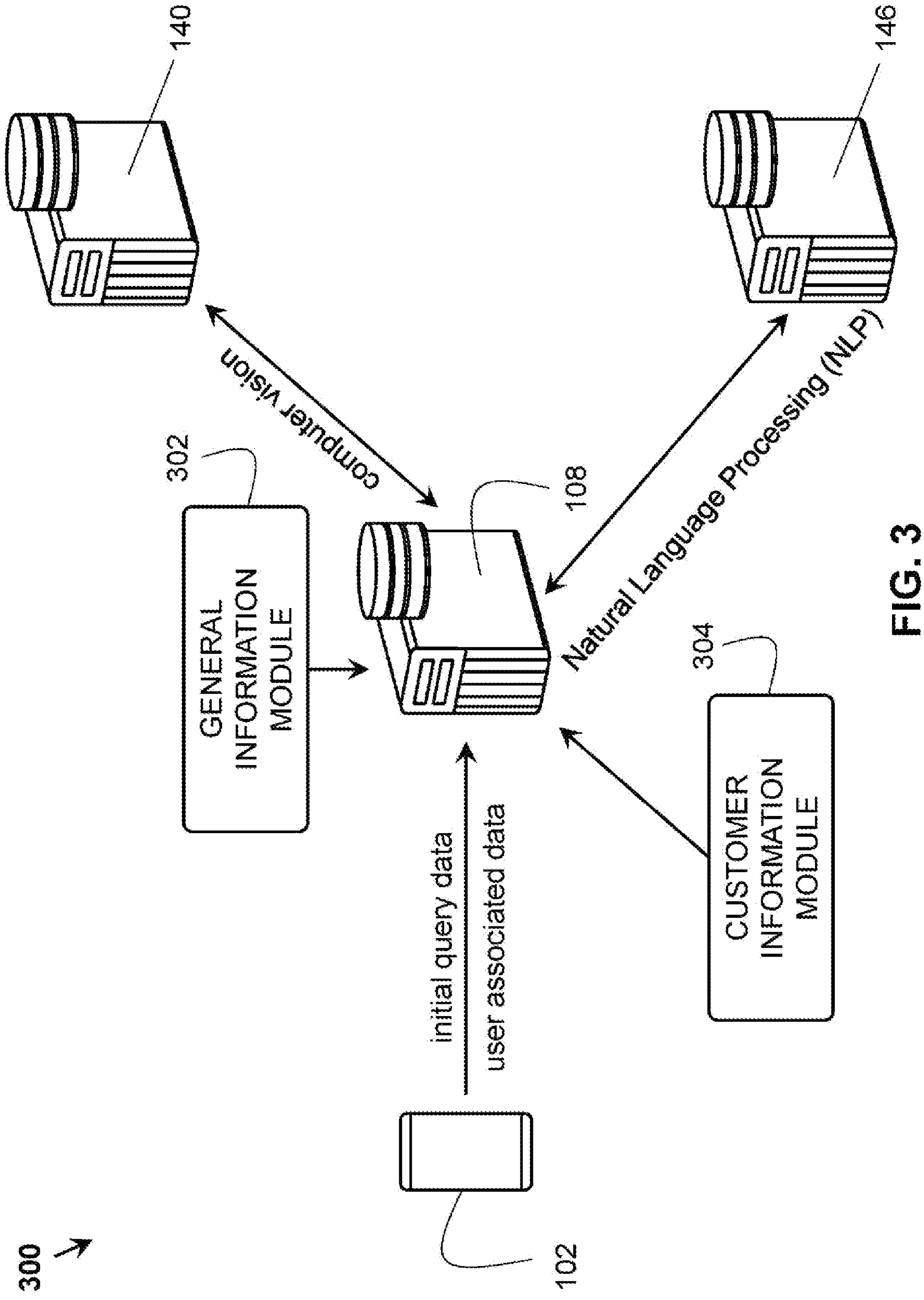
FIG. 3 illustrates an information flow diagram depicting the receipt and preprocessing of initial query data and user-associated data, in accordance with an embodiment of the present invention.

FIG. 2 illustrates a computer-implemented method 200 for enriching and structuring data associated with an item, in accordance with an embodiment of the present invention. The computer-implemented method begins at Step 202 when the processor 110 receives initial query data associated with an item in structured and/or unstructured form, from the user computing device 102. FIG. 3 illustrates an information flow diagram 300 depicting the receipt and preprocessing of the initial query data and the user-associated data, in accordance with an embodiment of the present invention. In several embodiments of the invention, the user computing device 102 provides the initial query data to the processor 110 using the dedicated standalone application through the first API server 104 and/or using the web browser application through the first web server 105. The initial query data may be in the form of a query statement, such as "There are five of us and we would like to go to a place where we have mountains and a lake next to the hotel. Must be within four hours of flight from London." The items in the query may be identified as "five individuals", "mountains", "lake", "hotel", "flight", or "London" to set up a context of the query. Another example of the initial query data may include "in going to a birthday party and would like to wear something that goes with my new Rayban sunglasses. It will be an outdoor party." The items in the second example may include "Rayban Sunglasses", "outdoor party", etc.

Although the initial query data in the given example is in the form of a text, in several embodiments of the invention, the initial query data may include textual data, aural data and/or visual data associated with the item. For example, the user may upload an image, a video, or an audio file through the web browser and/or the standalone application. In several alternate embodiments of the invention, the user may record an audio piece in real time or provide real-time stream of audiovisual input in form of a live video feed. The image data may also includes barcodes, QR codes, etc. The machine-readable instructions are envisaged to code for a general information module 302 that allows the processor 110 to extract general data pertaining to the item from the initial query data. In the case of textual and aural data, the processor 110 may perform feature recognition and text extraction from the textual data and/or the aural data using the NLP application 142 by accessing the NLP application server 140. The NLP application server 140 may then deploy NLP techniques on the textual and/or aural data. The NLP techniques may involve, for example, preprocessing (tokenization, normalization, stop word removal, part of speech tagging, etc.), syntactic analysis (parsing, dependency parsing, etc.), semantic analysis (Named Entity Recognition (NER), word sense disambiguation, sentiment analysis), and contextual understanding (coreference resolution, discourse analysis).

In the case of visual data, the processor 110 may perform feature recognition and text extraction from the visual data using computer vision application 148, by accessing the computer vision application server 146. The computer vision application server 146 may then deploy computer vision techniques on the visual data. The computer vision techniques may include, for example, image acquisition, preprocessing (color conversion, noise reduction, resizing and normalization), feature extraction, classification, object or item detection, image segmentation, instance segmentation, scene understanding, 3-Dimensional reconstruction, etc. In several embodiments of the invention, the processor 110 may further receive user-associated data, associated with the user, from the user computing device 102. The machine-readable instructions may further code for a customer information module 304 that allows the processor 110 to extract customer specific data from the user-associated data. The user-associated data may include name, social status, financial status, occupation, credit scores, age, gender, search history, historical behavior, inventory, etc. and other information relevant to responding to the initial query data. The processor 110 then generates enriched structured query data by adding information extracted from NLP techniques and computer vision techniques, and user-associated data to the initial query data and restructuring the resultant aggregate data and information. The enriched structured query data may be generated in the form of a JSON object.

Figure 4:
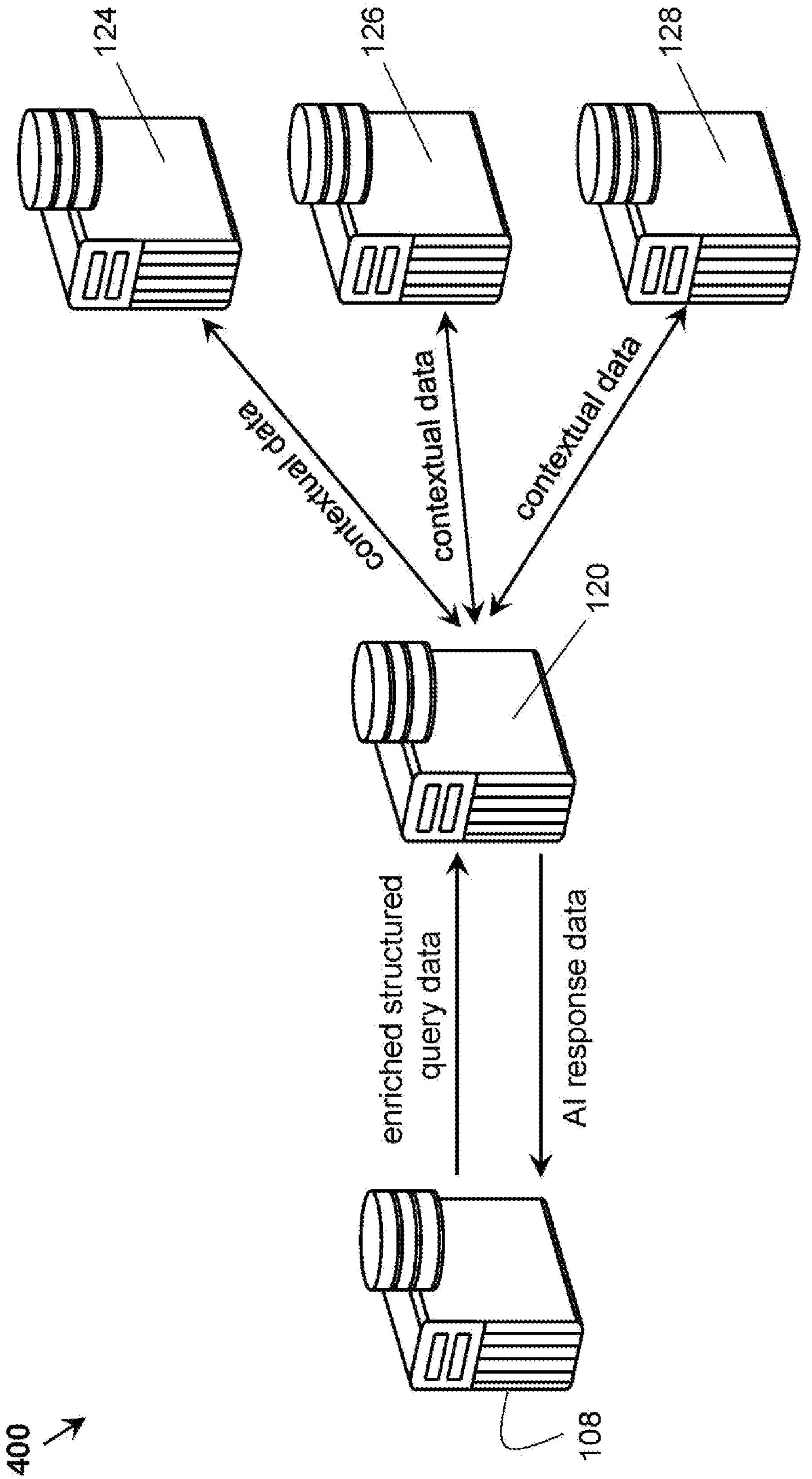
FIG. 4 illustrates an information flow diagram depicting the generation of AI response data in response to the information query data using a plurality of data repositories, in accordance with an embodiment of the present invention.

Referring to FIG. 2, at Step 204, the processor 110 provides the enriched structured query data to the AI agent 122 by accessing the AI agent server 120. The AI agent 122 is in communication with the plurality of data repositories 124, 126, and 128. For example, the AI agent 122 may communicate with several ticket and hotel booking sites and aggregator sites using a web scraper agent to generate an itinerary for the user looking to travel out of London. Or may communicate with several e-commerce platforms to identify a dress or a costume that may suit "Rayban sunglasses". The AI agent 122 may exchange contextual data specific to the initial query data to generate AI response data. FIG. 4 illustrates an information flow diagram 400 depicting the generation of AI response data in response to the information query data using a plurality of data repositories, in accordance with an embodiment of the present invention.

In several embodiments of the invention, the AI agent 122 customizes the AI response data in correlation with the user-associated data included in the enriched structured query data. For example, the processor 110 may share the color of the lenses of the "Rayban sunglasses" with the AI agent 122 to ensure that the dress or the outfit suggested by the AI agent 122 is in concordance with the color of the lenses, or in other scenarios fits the size of the user or is within the price range to fit the budget of the user. The AI response data may be structured and/or unstructured or partially structured. Furthermore, the AI agent server 120 transmits the AI response data to the application server 108 where the processor 108 receives the AI response data from the AI agent server 120. In several embodiments of the invention, the processor 110 provides the AI response data received from the AI agent 122 to the user computing device 102.

Figure 5:
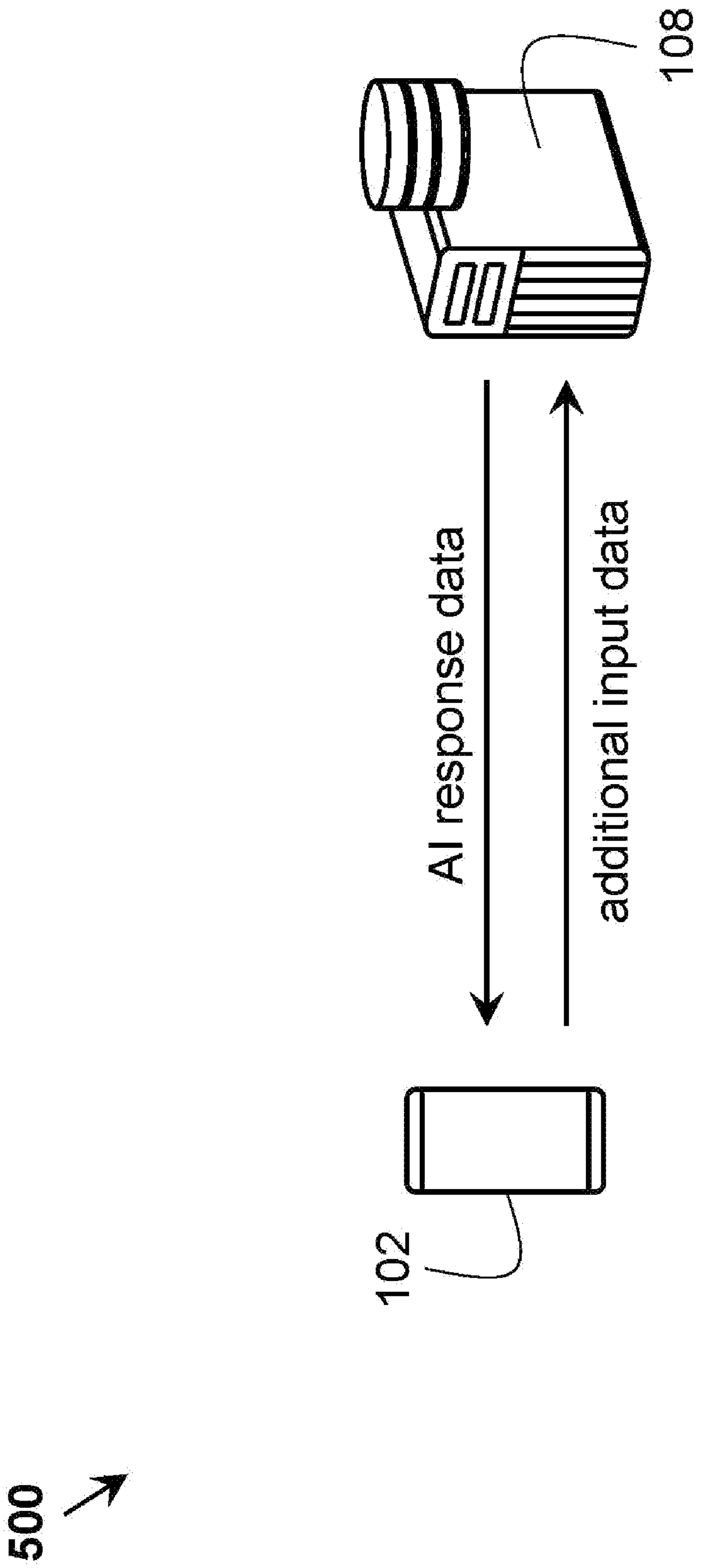
FIG. 5 illustrates an information flow diagram depicting the receipt of additional input data from in response to the AI response data, in accordance with an embodiment of the present invention.

Furthermore, the processor 110 receives additional input data from the user computing device 102 in response to the provision of the AI response data. For example, the additional input data may include need for additional beds, choice of kind of food (vegan, vegetarian, non-vegetarian), favorites sites to visit, kinds of favorable sites such museums, amusement parks, cafes, etc. in the case of the first example. In the case of the second example, the additional input data may include choice of color of the outfit, choice of color of shoes, type of outfit (formal, casual, etc.). FIG. 5 illustrates an information flow diagram 500 depicting the receipt of additional input data in response to the AI response data, in accordance with an embodiment of the present invention.

Figure 6:
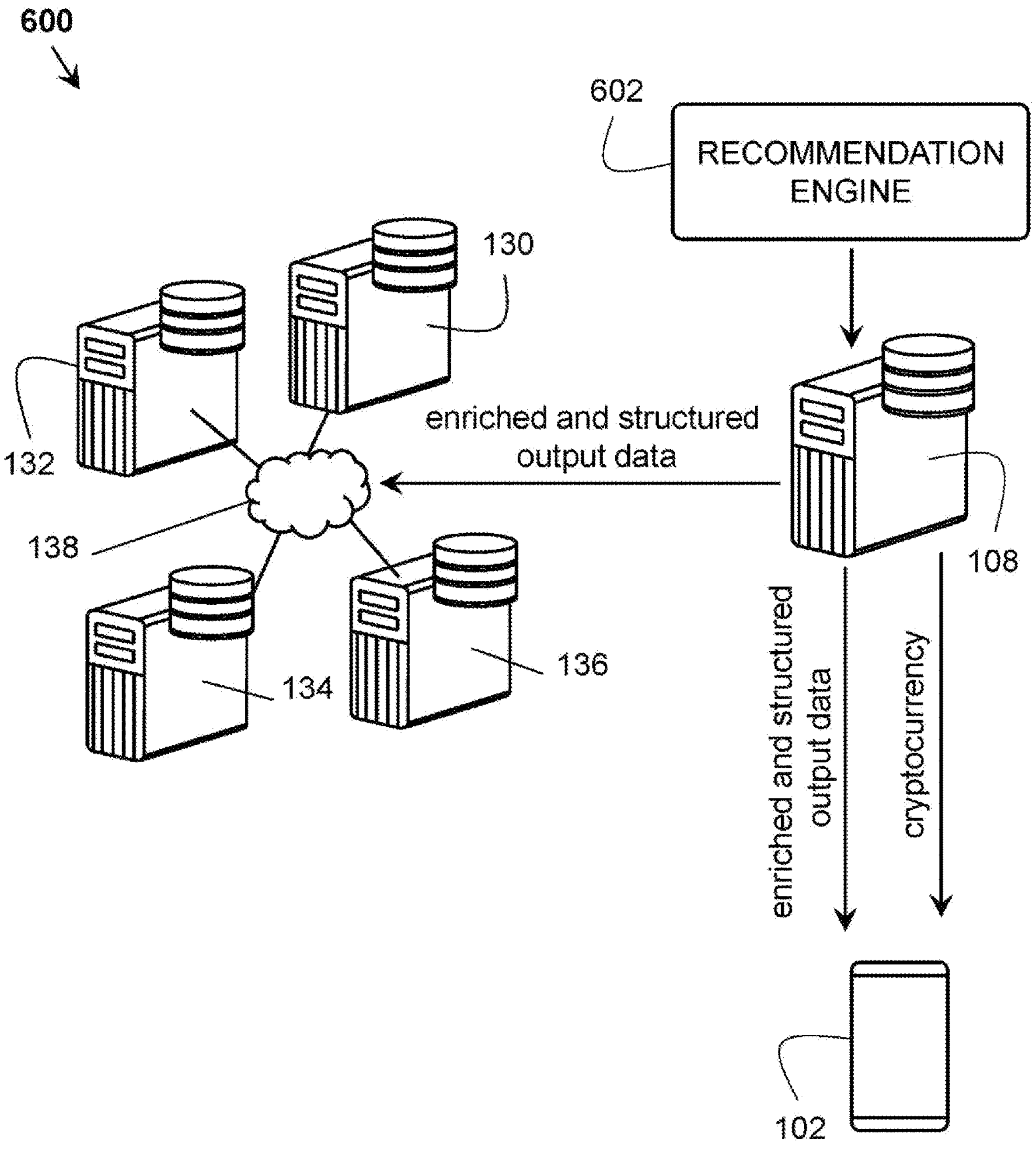
FIG. 6 illustrates an information flow diagram depicting the publishing of enriched and structured output data in a distributed database, in accordance with an embodiment of the present invention.

Referring to FIG. 2, at Step 206, the processor 110 adds the received AI response data to the initial query data to generate enriched data associated with the item. At Step 208, the processor 110 rearranges the enriched data into a predefined data structure to generate enriched and structured output data. In several embodiments of the invention, the processor 110 also adds the additional input data to the enriched and structured output data. At Step 210, the processor 110 transmits the enriched and structured output data to the user computing device 102. In several embodiments of the invention, the enriched and structured output data is transmitted to the user computing device 102 in the form of a JavaScript Object Notation (JSON) object. FIG. 6 illustrates an information flow diagram 600 depicting the transmittal of the enriched and structured output data to the user computing device 102 and the publishing of the enriched and structured output data in the distributed database, in accordance with an embodiment of the present invention.

In several embodiments of the invention, the machine-readable instructions may further code for a recommendation engine 602. The recommendation engine 602 when executed by the processor 110 would allow the processor 110 to incorporate one or more recommendations in the enriched and structured output data. In that regard, the processor 110 executing the recommendation engine 602 would perform several functions, such as text analysis, leveraging past data, content-based filtering, collaborative filtering, text generation, ranking, etc. The text analysis may include analyzing text input to extract explicit and implicit preferences. Leveraging past data may include analysis of history or provided data (for example, rankings and ratings) to create a preference profile for the user. Furthermore, during content-based filtering, the processor 110 may analyze the content related to the item (text, product descriptions, movie synopses, etc.). The processor 110 would then create representations of these items and match them to the identified user preferences. The processor 110 would then find patterns in the behavior of many users. If users with similar tastes have interacted positively with an item, there is a higher chance the current user will like it, too. The processor 110 would then generate text to explain and accompany the recommendations. The explanation may highlight aspects that align with the preferences of the user or showcase the benefits of a particular item. The processor 110 may then help rank multiple potential recommendations to ensure those most likely to be of interest to the user are prioritized. The recommendation engine 602, in that regard, provides several benefits, including deeper understanding of user preferences, personalization, handling of unstructured data, etc.

For the first example, a structured list of hotels and flights that match the requirements of the user is compiled. In another aspect of the present invention, links to respective platforms for booking are provided to the user, as well as itinerary options. For the second example, a structured list of attire is compiled that matches the requirements of the user. Links to respective e-commerce platforms for purchasing are provided to the user. Recommendations for accessories and styling based on the desired style are provided to the user. In several embodiments of the invention, the processor 110 adds the enriched and structured output data to a decentralized database maintained on the plurality of compute nodes 130, 132, 134, and 136. Furthermore, the user is rewarded for adding the enriched and structured output data to the decentralized database as the processor 110 then adds a predetermined amount of a cryptocurrency to a digital wallet associated with the user computing device 102.

Figure 7:
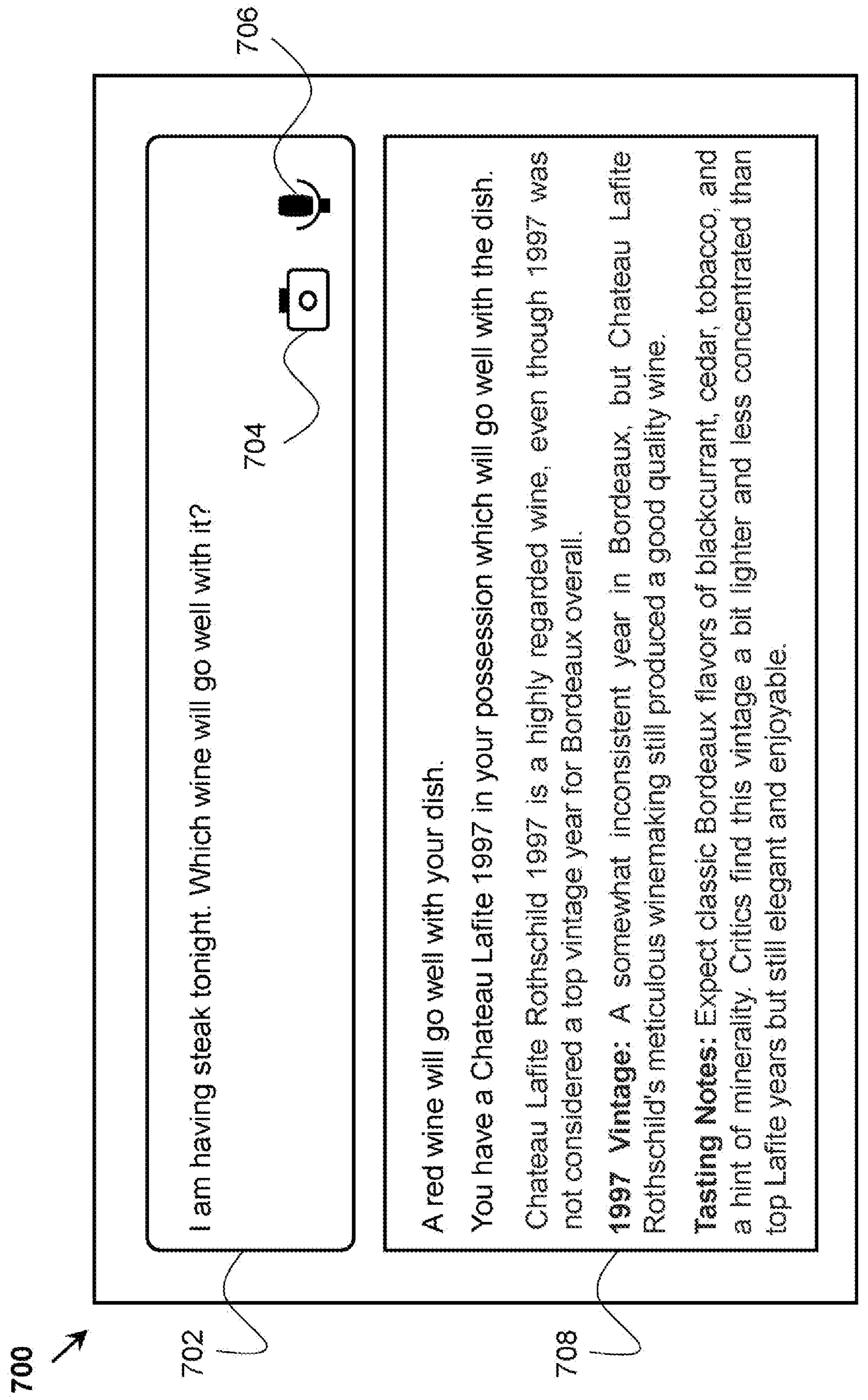
FIG. 7 illustrates an example user interface for implementing the computer-implemented method of FIG. 2, in accordance with an embodiment of the present invention.

FIG. 7 illustrates an example user interface 700 for implementing the computer-implemented method 200 of FIG. 2, in accordance with an embodiment of the present invention. The user interface 700 includes a query window 702 to receive the initial query data as "I am having steak tonight. Which wine will go well with it?". The user may be able to provide an aural input by clicking on a microphone soft button 706 or provide an image of a label of a wine bottle by clicking on an image upload soft button 704. The processor 110 then provides the enriched and structured output data associated with items "stake" and "wine" in the output window 708 as shown in FIG. 7.

Various modifications to these embodiments are apparent to those skilled in the art, from the description and the accompanying drawings. The principles associated with the various embodiments described herein may be applied to other embodiments. Therefore, the description is not intended to be limited to the embodiments shown along with the accompanying drawings but is to provide the broadest scope consistent with the principles and the novel and inventive features disclosed or suggested herein. Accordingly, the invention is anticipated to hold on to all other such alternatives, modifications, and variations that fall within the scope of the present invention and appended claims.

The invention claimed is:

1. A computer-implemented method for enriching and structuring data associated with an item, the computer-implemented method comprising:
- receiving initial query data associated with the item in structured and/or unstructured form, from a user computing device associated with a user and generating enriched structured query data, wherein the initial query data comprises textual data, aural data and/or visual data associated with the item;
- providing the enriched structured query data to an Artificial Intelligence (AI) agent and receiving AI response data associated with the item, in structured and/or unstructured form, from the AI agent, wherein the AI agent is in communication with a plurality of data repositories;
- adding the received AI response data to the initial query data to generate enriched data associated with the item;
- rearranging the enriched data into a predefined data structure to generate enriched and structured output data, wherein the enriched and structured output data comprises one or more recommendations pertaining to the item; and
- transmitting the enriched and structured output data to the user computing device;
- adding the enriched and structured output data to a decentralized database maintained on a plurality of compute nodes; and
- providing the AI response data received from the AI agent to the user computing device,
- receiving additional input data from the user computing device in response to the provision of the AI response data,
- adding the additional input data to the enriched and structured output data, and
- rewarding the user computing device for additional input data.

2. The computer-implemented method as claimed in claim 1, further comprising adding a digital reward, such as a cryptocurrency to an account associated with the user computing device.

3. The computer-implemented method as claimed in claim 1, further comprising performing feature recognition and text extraction from the visual data using computer vision algorithms.

4. The computer-implemented method as claimed in claim 1, further comprising performing feature recognition and text extraction from the textual data and/or the aural data using Natural Language Processing (NLP) algorithms.

5. The computer-implemented method as claimed in claim 1, wherein the enriched and structured output data is transmitted to the user computing device in form of a JavaScript Object Notation (JSON) object.

6. The computer-implemented method as claimed in claim 1, further comprising receiving user-associated data, associated with the user, from the user computing device.

7. The computer-implemented method as claimed in claim 6, wherein the enriched structured query data comprises the user-associated data to customize the AI response data in correlation with the user-associated data.

8. A computing system for enriching and structuring data associated with an item, the computing system comprising:
- a processor; and
- a memory unit operably connected to the processor, the memory unit comprising machine-readable instructions, that when executed by the processor, enable the processor to:
- receive initial query data associated with the item in structured and/or unstructured form, from a user computing device associated with a user and generate enriched structured query data, wherein the initial query data comprises textual data, aural data and/or visual data associated with the item,
- provide the enriched structured query data to an Artificial Intelligence (AI) agent and receive AI response data associated with the item, in structured and/or unstructured form, from the AI agent, wherein the AI agent is in communication with a plurality of data repositories,
- add the received AI response data to the initial query data to generate enriched data associated with the item,
- rearrange the enriched data into a predefined data structure to generate enriched and structured output data, wherein the enriched and structured output data comprises one or more recommendations pertaining to the item,
- transmit the enriched and structured output data to the user computing device, and
- add the enriched and structured output data to a decentralized database maintained on a plurality of compute nodes; and
- provide the AI response data received from the AI agent to the user computing device,
- receive additional input data from the user computing device in response to the provision of the AI response data,
- add the additional input data to the enriched and structured output data, and
- reward the user computing device for additional input data.

9. The computing system as claimed in claim 8, wherein the processor is further enabled to add a digital reward, such as a cryptocurrency to an account associated with the user computing device.

10. The computing system as claimed in claim 8, wherein the processor is further enabled to perform feature recognition and text extraction from the visual data using computer vision algorithms.

11. The computing system as claimed in claim 8, wherein the processor is further enabled to perform feature recognition and text extraction from the textual data and/or the aural data using Natural Language Processing (NLP) algorithms.

12. The computing system as claimed in claim 8, wherein the processor is further enabled to transmit the enriched and structured output data to the user computing device in form of a JavaScript Object Notation (JSON) object.

13. The computing system as claimed in claim 8, wherein the processor is further enabled to receive user-associated data, associated with the user, from the user computing device.

14. The computing system as claimed in claim 13, wherein the enriched structured query data comprises the user-associated data to customize the AI response data in correlation with the user-associated data.

* * * * *